P. KLUGE.
MACHINE FOR CUTTING ROUND RODS.
APPLICATION FILED SEPT. 21, 1910.
1,006,102.
Patented Oct. 17, 1911.
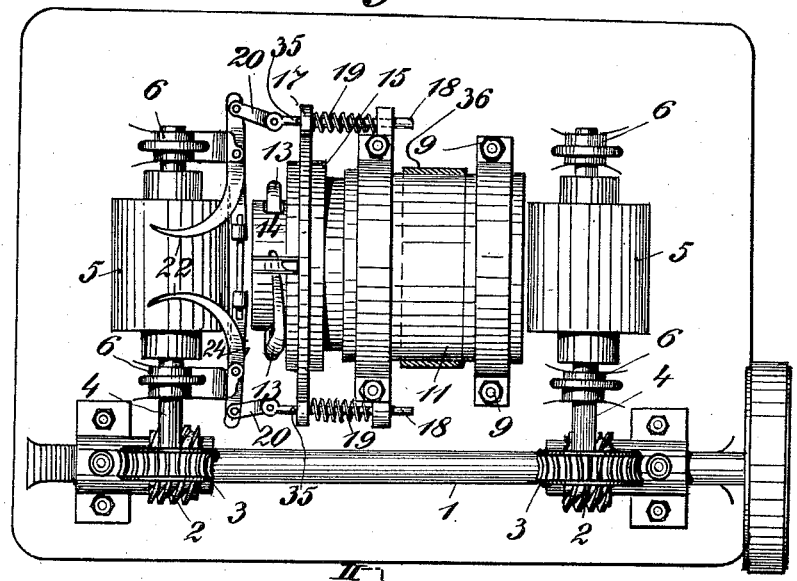
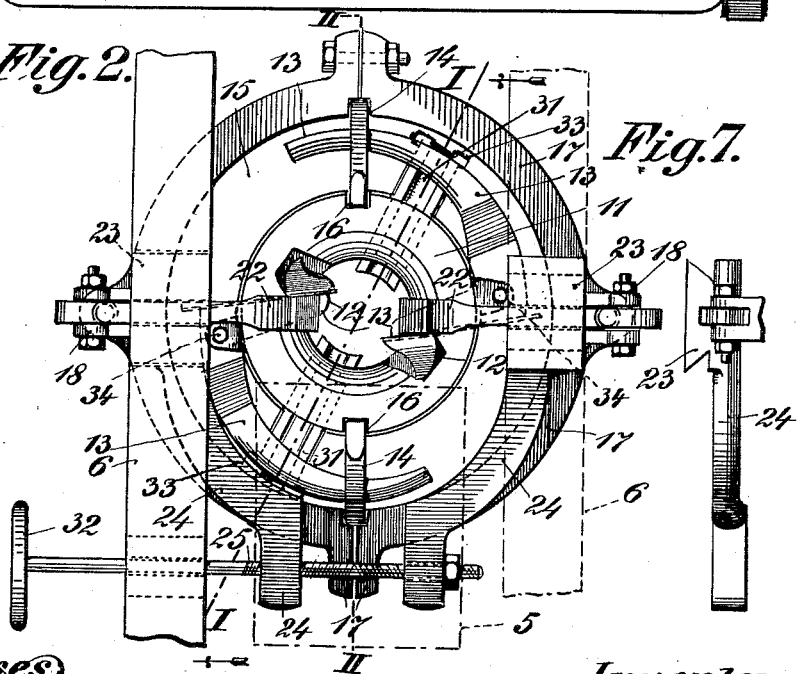

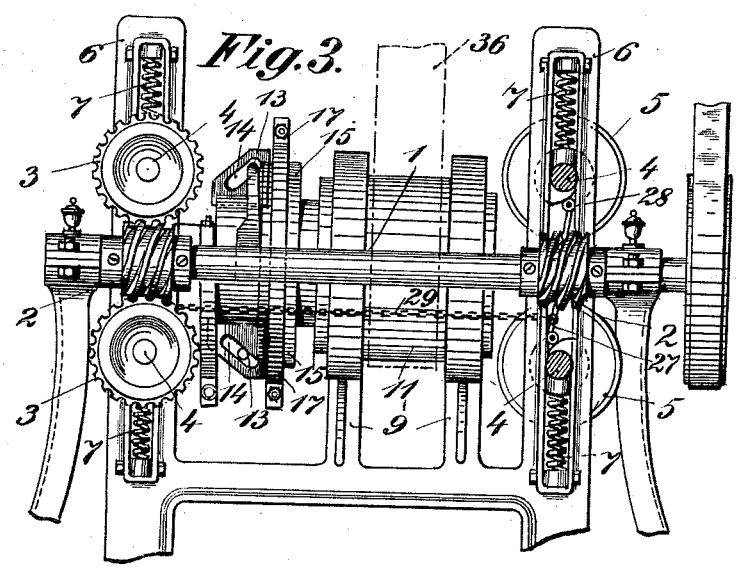
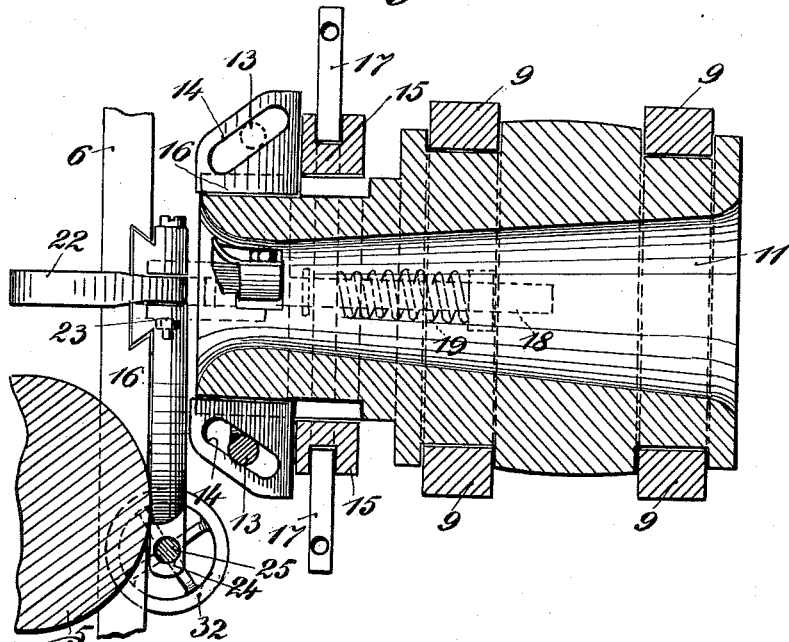

P. KLUGE.
MACHINE FOR CUTTING ROUND RODS.
APPLICATION FILED SEPT. 21, 1910.
1,006,102.
Patented Oct. 17, 1911.
3 SHEETS—SHEET 3.
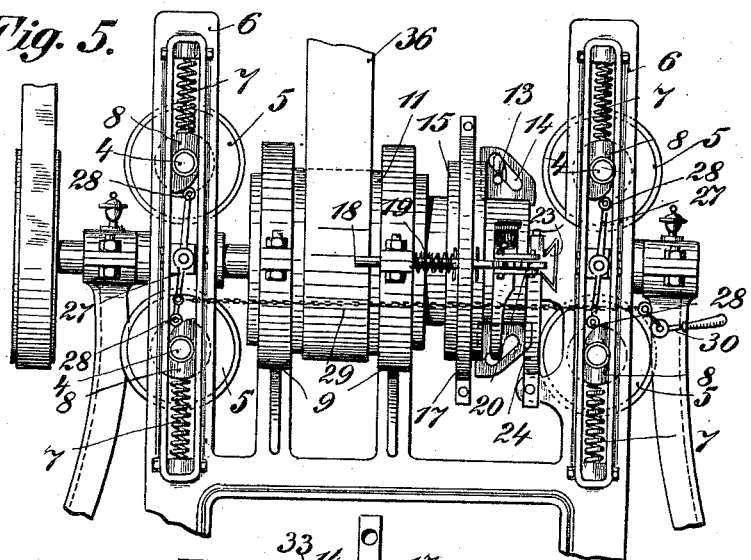
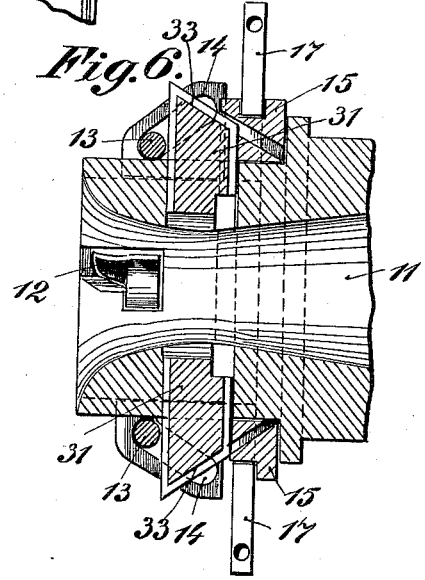
Witnesses:
Inventor:

UNITED STATES PATENT OFFICE.

PAUL KLUGE, OF DROCHOW, GERMANY.

MACHINE FOR CUTTING ROUND RODS.

1,006,102. Specification of Letters Patent. Patented Oct. 17, 1911.

Application filed September 21, 1910. Serial No. 583,105.

*To all whom it may concern:*

Be it known that I, PAUL KLUGE, a subject of the German Emperor, and resident of Drochow, N. L., Post Annahütte, Germany, have invented certain new and useful Improvements in Machines for Cutting Round Rods, of which the following is a specification.

My invention refers to a machine for cutting round rods, tool handles and the like, the essential feature of which consists in the cutters being arranged in a socket so as to be automatically adjusted by the workpiece according to the thickness of the rods being cut.

According to the present invention this socket is expanded toward the outlet so as also to be able to cut curved rods or handles which are conducted into the socket by guides automatically adjusted accordingly to the position of the cutters. Furthermore, while cutting, the position of the cutters can be regulated by hand or otherwise, irrespective of the thickness of the rods to be cut so that it is possible to make the cutters bite more or less in spite of the adjustment by the workpiece. The introduction and removal of the rod is effected by spring-mounted feed rollers which can be simultaneously thrown out of action by means of a lever.

With the known machines for this class of work either the automatic adjustment of the cutters or the automatic feeding of the rod is lacking. Other machines have the disadvantage that the rod cannot be cut conically at its lower end so that the rod or handle must be specially dressed before it can be used. This is altogether avoided by the present invention. It may furthermore be remarked that with the known machines it is not possible instantaneously to switch off the feeding device without stopping the whole machine, whereas according to the present invention this can be effected by means of a single lever.

I shall now describe my invention with reference to the accompanying drawings in which:—

Figure 1 shows a plan view of a machine according to the present invention. Fig. 2 shows on a larger scale a front elevation of the cutting device. Fig. 3 is a side view of the machine. Fig. 4 is a longitudinal section through the socket, taken on line II—II of Fig. 2. Fig. 5 is a side view opposed to that of Fig. 3. Fig. 6 is a section on the line I—I of Fig. 2. Fig. 7 shows a detail.

Two worms 2 are provided on the shaft 1 and each drives two worm wheels 3 each of which rotate a shaft 4 to which are keyed the two pairs of feed rollers 5. The shafts 4 are slidably mounted in bearing-pieces 8 in the standards 6, coil springs 7 being arranged above the upper shafts and below the lower shafts, with the tendency to press the feed rollers against each other. By means of a special disengaging device described below, the worm wheels 3 and consequently also the rollers 5 can be thrown into or out of gear.

The actual cutting device is rotatively arranged in separate bearings 9 and consists of a socket 11 conically expanding toward the back. Blades or cutters 12 are adjustably arranged in this socket, the setting of the cutters being accomplished by means of angle levers 13, to which the said cutters are fastened and which for their part can be raised or lowered by slotted guides 14. (Figs. 2 and 4). These slotted guides which are situated outside the socket 11, slide in grooves 16 and the slots in the guides 14 for the levers 13, which adjust the cutters, are arranged at an angle to the middle axis of the socket 11 so that the forward and backward movement of the slotted guides 14 produces opposite movements of the levers 13. The forward and backward movement of the slotted guides 14 is produced by a movable ring 15, to which the slotted guides 14 are attached. By the arrangement of the grooves 16 the ring 15 is so connected with the socket 11 that it must accompany the movement of the latter, because the slotted guides 14, which rest in the grooves 16, are connected to the ring 15. Furthermore this ring 15 is connected with a ring 17 which, however, cannot rotate with the ring 15, inasmuch as the guide rods 18 prevent any rotation of the same (Figs. 1 and 3). Coil springs 19 are provided on these guide rods 18 and rest on the one side on the bearing 9 and on the other side press the ring 17 toward the front end of the socket 11 thereby at the same time moving the ring 15 until it rests against the angle levers 13, to which as already mentioned, are fitted the cutters 12 on the one arm, whereas the other arm engages in the slotted guides 14. These angle levers 13 are pivoted in the socket 11 at 34 (Fig. 2) so that when moving the ring 17 and consequently also the slotted guides, both the lever arms of the levers 13 are simultaneously raised or lowered, thereby occasioning a corresponding adjustment of the cutters 12. The guide rods 18 are moved by angle levers 22 which are connected to the former by means of links 20. (Figs. 1 and 2). One of the arms of the angle levers 22, which are preferably curved, lies between the transport rollers 5 arranged at the forward end of the machine, so that if a rod is pushed between these lever arms they will be pressed apart and their movement will be transmitted to the guide rods 18, and the ring 17, which is held by the guide rods by means of stops 35, will be moved back. Inasmuch, however, as this ring lies in a groove of the ring 15 the latter will also be moved in the same direction as the ring 17, the result being that the angle levers 13 and consequently also the cutters 12 will be correspondingly adjusted by the slotted guides 14. In order, however, to be able to obtain a greater stroke than normal of the angle levers 22, the latter are mounted on slide pieces 23 which are arranged by means of a dove-tail projection in a correspondingly formed groove in the bearing frame 6 whereby these angle levers can be correspondingly adjusted. (Figs. 2 and 7.) Arms 24 are provided on these slide pieces 23 and are traversed by a screw-spindle 25 with right and left screw threads and rotating in a guide fastened to the bearing frame 6. This rod 25 can be adjusted by the small hand wheel 32, the rotation of the latter causing the simultaneous drawing together or separation of the angle levers 22 thereby resulting in an additional adjustment for the cutters.

The socket 11 is rotated by a belt 36 from a suitable transmission gear but this can also be effected from the shaft 1 by intermediation of toothed wheels or the like, the shaft 1 being rotated from a suitable source of power.

For the purpose of throwing the feed rollers 5 out of working, a double-arm lever 27 is pivoted on each side of the standards 6, (Figs. 3 and 5). Each of these levers is provided at both ends with press-rollers 28 which rest against the bearing pieces 8 of the shafts 4. Each two levers 27 situated on the one side of the machine are connected by chains 29 or rods which, are connected with a separately mounted angle lever 30. By pressing on this lever all the levers 27 will be simultaneously moved so that the rollers 28 will engage against the bearing-pieces 8 thus producing a separation of these bearing pieces and consequently throwing the transport rollers out of action because the worm wheels 3 will be disengaged from the worms 2.

Guides 31 are provided in the socket 11 behind the cutters for the purpose of assisting the guiding of the rods to be cut during the first stages of the working, (Figs. 4 and 6), the slide surfaces 33 of the guide parts 31 being also arranged at an angle to the middle axis of the socket 11 and slide in corresponding guides of the ring 15 so that simultaneously with the adjustments of the cutters a corresponding displacement of the guides 31 is occasioned.

The machine works in the following manner: The wooden rod to be cut is introduced between the front feed rollers 5, which push the rod through the angle levers 22 into the socket 11 between the cutters 12. The angle levers 22 are thus pressed apart correspondingly to the thickness of the rod to be cut thereby causing the ring 17 together with the guide rods 18 and consequently also the ring 15 to be pressed back. (See Fig. 6.) The slotted guides 14 rigidly connected with the ring will also be moved back and, as the slots are arranged at an angle, the angle levers 13 will be lowered as well as the cutters 12. The socket 11, which is rotated in a uniform manner, rotates the cutters and thus cuts the rod perfectly round. The rod guides on the slides 31 and is moved still farther along by the front feed rollers 5 until it reaches the back feed rollers 5 which now withdraw the finished rod or handle. In order, however, to be able to manufacture curved rods or shafts, the rod to be cut is inserted between the feed rollers at an angle to the middle axis of the machine correspondingly to the desired curving. The rod is moved forward by the feed roller 5 until it rests against the side walls of the interior of the socket 11. The rod will slide along the side walls thereby occasioning a uniform curving. The tapering of the handle is obtained by means of the wheel 32, because by displacing the pivoting point of the angle levers 22 the guide rods and consequently the whole adjusting device of the cutters is simultaneously actuated.

With the greater number of machines of this kind the curving of the shaft or rod to be cut is not possible so that the shaft or rods have to undergo a separate working if they have to be employed for sand-shovels.

Various modifications may be introduced in the construction of the different parts according to the requirements in each separate case.

What I claim as my invention and desire to secure by Letters Patent is:—

1. In a machine of the kind described in combination, a machine frame, a sleeve rotatably mounted in the latter, means for rotating said sleeve, angle levers having their one arms projecting into said sleeve, cutters fixed to said arms of said angle levers and likewise projecting into said sleeve, guide pieces lengthwise shiftable in said sleeve and having inclined slots, the free arms of said angle levers engaging said slots, a ring shiftable on said sleeve and being connected with said slotted guide-pieces, and adjusting levers adapted to be moved by the shaft to be cut and to move said shiftable ring, guides for the shaft to be cut movably arranged in said sleeve, and means adapted to adjust said guides correspondingly to the position of said cutters, substantially as set forth.

2. In a machine of the kind described in combination, a machine frame, a sleeve rotatably mounted in the latter, means for rotating said sleeve, angle levers having their one arms projecting into said sleeve, cutters fixed to said arms of said angle levers and likewise projecting into said sleeve, guide pieces lengthwise shiftable in said sleeve and having inclined slots, the free arms of said angle levers engaging said slots, a ring shiftable on said sleeve and being connected with said slotted guide-pieces, and adjusting levers adapted to be moved by the shaft to be cut and to move said shiftable ring, said adjusting levers being shiftably journaled, and means for shifting said adjusting levers, guides for the shaft to be cut movably arranged in said sleeve, and means adapted to adjust said guides correspondingly to the position of said cutters, substantially as and for the purpose set forth.

3. In a machine of the kind described in combination, a machine frame, a sleeve rotatably mounted in the latter, means for rotating said sleeve, angle levers having their one arms projecting into said sleeve, cutters fixed to said arms of said angle levers and likewise projecting into said sleeve, guide pieces lengthwise shiftable in said sleeve and having inclined slots, the free arms of said angle levers engaging said slots, a ring shiftable on said sleeve and being connected with said slotted guide-pieces, and adjusting levers adapted to be moved by the shaft to be cut and to move said shiftable ring, said adjusting levers being shiftably journaled, and means for shifting said adjusting levers, and guides for the shaft to be cut movably arranged in said sleeve and engaging inclined guide grooves in said ring, substantially as and for the purpose set forth.

4. In a machine of the kind described in combination, a machine frame, a sleeve rotatably mounted in the latter, means for rotating said sleeve, angle levers having their one arms projecting into said sleeve, cutters fixed to said arms of said angle levers and likewise projecting into said sleeve, guide pieces lengthwise shiftable in said sleeve and having inclined slots, the free arms of said angle-levers engaging said slots, a ring shiftable on said sleeve and being connected with said slotted guide-pieces, and adjusting levers adapted to be moved by the shaft to be cut and to move said shiftable ring, said adjusting levers being shiftably journaled, and means for shifting said adjusting levers, and guides for the shaft to be cut movably arranged in said sleeve and engaging inclined guide grooves in said ring, substantially as set forth.

In testimony whereof I have hereunto signed my name this 9th day of September 1910, in the presence of two subscribing witnesses.

PAUL KLUGE.

Witnesses:
HENRY HASPER,
WOLDEMAR HAUPT.

---

Copies of this patent may be obtained for five cents each, by addressing the "Commissioner of Patents, Washington, D. C."